(12) United States Patent
Amrein (10) Patent No.: US 6,330,839 B1
(45) Date of Patent: Dec. 18, 2001

(54) METHOD AND APPARATUS FOR STRIPPING AND REMOVING THE SHIELDING FROM A CABLE

(75) Inventor: Alois Amrein, Rapperswil (CH)

(73) Assignee: cawitec AG, Einsiedeln (CH)

( * ) Notice: Subject to any disclaimer, the term of this patent is extended or adjusted under 35 U.S.C. 154(b) by 0 days.

(21) Appl. No.: 09/651,990

(22) Filed: Aug. 30, 2000

(30) Foreign Application Priority Data

Nov. 1, 1999 (EP) .................................................. 99810990

(51) Int. Cl.[7] .................................................. H02G 1/12
(52) U.S. Cl. .................................................. 81/9.51; 29/828
(58) Field of Search ................ 81/9.51; 29/828; 83/924

(56) References Cited

U.S. PATENT DOCUMENTS

| | | | |
|---|---|---|---|
| 2,929,285 | * | 3/1960 | Gulemi .................................. 81/9.51 |
| 2,988,940 | * | 6/1961 | Folkenroth et al. ................... 81/9.51 |
| 3,044,333 | * | 7/1962 | Broske .................................. 81/9.51 |
| 3,044,334 | * | 7/1962 | Broske .................................. 81/9.51 |
| 3,139,778 | * | 7/1964 | Bielinski et al. ...................... 81/9.51 |
| 3,153,358 | | 10/1964 | Havens . |
| 3,171,306 | * | 3/1965 | Mirsch .................................. 81/9.51 |
| 4,019,409 | * | 4/1977 | McKeever .............................. 81/9.51 |
| 4,719,697 | * | 1/1988 | Schwartzman et al. ............... 81/9.51 |
| 4,763,410 | * | 8/1988 | Schwartzman ........................ 81/9.51 |
| 4,914,986 | * | 4/1990 | Masaki .................................. 81/9.51 |
| 5,072,632 | * | 12/1991 | Sayyadi ................................. 81/9.51 |
| 5,074,169 | | 12/1991 | Matz . |
| 5,138,910 | * | 8/1992 | Ishikawa et al. ...................... 81/9.51 |
| 5,867,896 | * | 2/1999 | Watanabe .............................. 29/828 |

FOREIGN PATENT DOCUMENTS 43 27 356 A1   2/1995  (DE) .

* cited by examiner

Primary Examiner—James G. Smith
Assistant Examiner—Hadi Shakeri
(74) Attorney, Agent, or Firm—Henry M. Feiereisen (57) ABSTRACT

In a method of stripping and removing shielding from a cable, an end of the cable is stripped from an outer insulating sheath to expose a portion of the shielding which envelopes an inner electrical conductor. The exposed shielding portion is compressed in axial direction of the cable to so deform the shielding portion as to assume a donut shape which exceeds an outer dimension of the insulating sheath. A cutting unit is movable approximately transversely to a longitudinal orientation of the cable to shear off a circular section of the shielding portion.

21 Claims, 6 Drawing Sheets

METHOD AND APPARATUS FOR STRIPPING AND REMOVING THE SHIELDING FROM A CABLE

CROSS-REFERENCES TO RELATED APPLICATIONS

This application claims the priority of European Patent Application, Ser. No. 99 810 990.4, filed Nov. 1, 1999, the subject matter of which is incorporated herein by reference.

BACKGROUND OF THE INVENTION

The present invention relates to a method and apparatus for stripping and removing the shielding from a cable.

U.S. Pat. No. 3,153,358 describes a shielded wire stripper by which, after removal of the outer sheath, the exposed cable end with shielding is placed into respective bores of first and second casings and so retained that the metallic shielding is compressed, when the second casing moves relative thereto in axial direction of the cable, and pushed by the second casing, which is provided with a counterbore, against a circular shoulder of the first casing, thereby shearing off the shielding. The separation process is thus implemented substantially through a shearing action which acts in axial direction of the cable. This is disadvantageous because the cable end and in particular the sheath in the area of the cable will fray and the shielding will expand out, thereby adversely affecting the electric connection.

SUMMARY OF THE INVENTION

It is thus an object of the present invention to provide an improved method for stripping and removing shielding from a cable, obviating the afore-stated drawbacks.

In particular, it is an object of the present invention to provide an improved method for stripping and removing shielding from a cable, by which the cable end of an electric conductor, after trimming away the insulating sheath, can be stripped of the enveloping shielding in a simple and cost-efficient manner to realize a reliable connection, without altering a relative geometric disposition in particular of two, three or more electric conductors, whereby this requirement is also ensured in relatively thin cables.

These objects, and others which will become apparent hereinafter, are attained in accordance with the present invention by stripping away the insulating sheath from an end of the cable to expose a portion of shielding, which envelopes an inner electrical conductor; compressing the exposed shielding portion in axial direction of the cable to so deform the shielding portion as to assume a donut shape which exceeds an outer dimension of the insulating sheath; and severing a circular section of the bunched shielding portion by a cutting unit which is movable approximately transversely to a longitudinal orientation of the cable.

According to another feature of the present invention, the exposed shielding portion is held between two clamping devices which are spaced-apart in axial direction of the cable and movable relative to one another, with the compression being implemented by moving the clamping devices relative to one another to thereby push together and bunch up the shielding portion until the donut-shape is realized.

Suitably, the circular section of the bunched shielding portion is positioned above the insulating sheath and has a substantially triangular-shaped configuration, whereby the triangular-shaped circular section has walls extending at an acute angle.

According to another feature of the present invention, the cutting unit can be moved from an idle position, in which the cutting unit extends transversely to a longitudinal axis of the cable, to an operative position, in which the cutting unit orbits around the bunched shielding portion for shearing off the circular section. Suitably, the bunched shielding portion is sheared off directly at an outer periphery of the insulation by the cutting unit orbiting around the bunched shielding portion. Of course, it is also possible to turn the cable and the bunched shielding portion relative to the cutting unit in the operative position for shearing off the circular section.

It is still another object of the present invention to provide an improved apparatus for carrying out the novel and inventive method of stripping and removing shielding from a cable, in accordance with the present invention.

This object is attained in accordance with the present invention by providing a pair of clamping devices for insertion of a cable which has been stripped of its insulating sheath to thereby expose a portion of a shielding, with the clamping devices so positioned at a distance to one another as to confine the exposed shielding portion therebetween, wherein the clamping devices are movable relative to one another to compress and bunch up the shielding portion to assume a donut shape; and by providing a cutting device movable in a direction transversely to a longitudinal direction of the cable for shearing off the bunched shielding portion.

BRIEF DESCRIPTION OF THE DRAWING

The above and other objects, features and advantages of the present invention will be more readily apparent upon reading the following description of a preferred exemplified embodiment of the invention with reference to the accompanying drawing, in which.

DETAILED DESCRIPTION OF PREFERRED EMBODIMENTS

Throughout all the Figures, same or corresponding elements are generally indicated by same reference numerals.

Turning now to the drawing, and in particular to FIGS. 1A to 1I, there are shown schematic illustrations of various process stages of the method for stripping and removing an exposed shielding portion 12 from a cable 10, in accordance with the present invention. The cable 10 may be any commercially available jacketed cable comprised of two or more electric conductors 15, which are held together in the form of a bundle by a transparent envelope (not shown), a shielding 120 (only exposed shielding portion 12 is shown here), which envelopes the conductors 15 and a stranded wire (not shown) and may be formed as a wire braid shielding, and an outer insulating sheath 11 which envelopes the shielding 120.

Figure 1A:
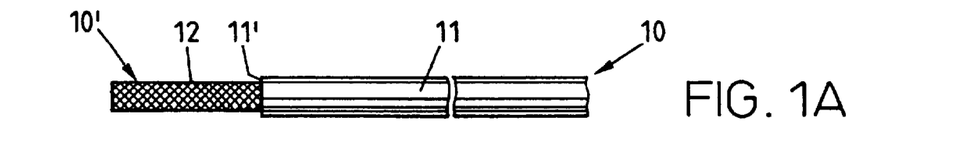
FIGS. 1A to 1I show schematic illustration s of various process stages of the method for stripping and removing an exposed shielding portion from a cable, in accordance with the present invention.

FIG. 1A shows the cable 10 having a cable end 10' which is stripped from the insulating sheath 11 by a suitable tool to thereby expose the shielding portion 12. In order to realize a reliable connection of the electric conductors 15, the shielding portion 12 should be stripped away precisely and as closely as possible to the circular end face 11' of the insulating s heath 1.

Figure 1B:
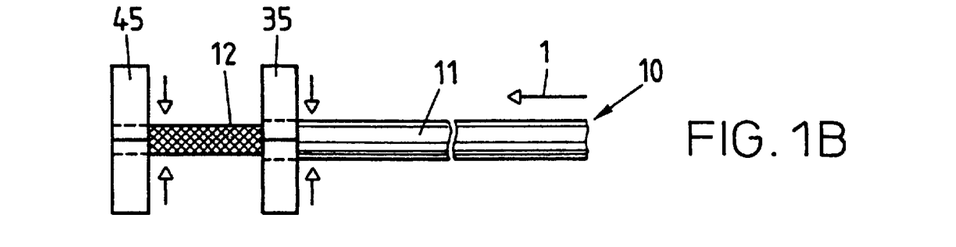
Figure 3:
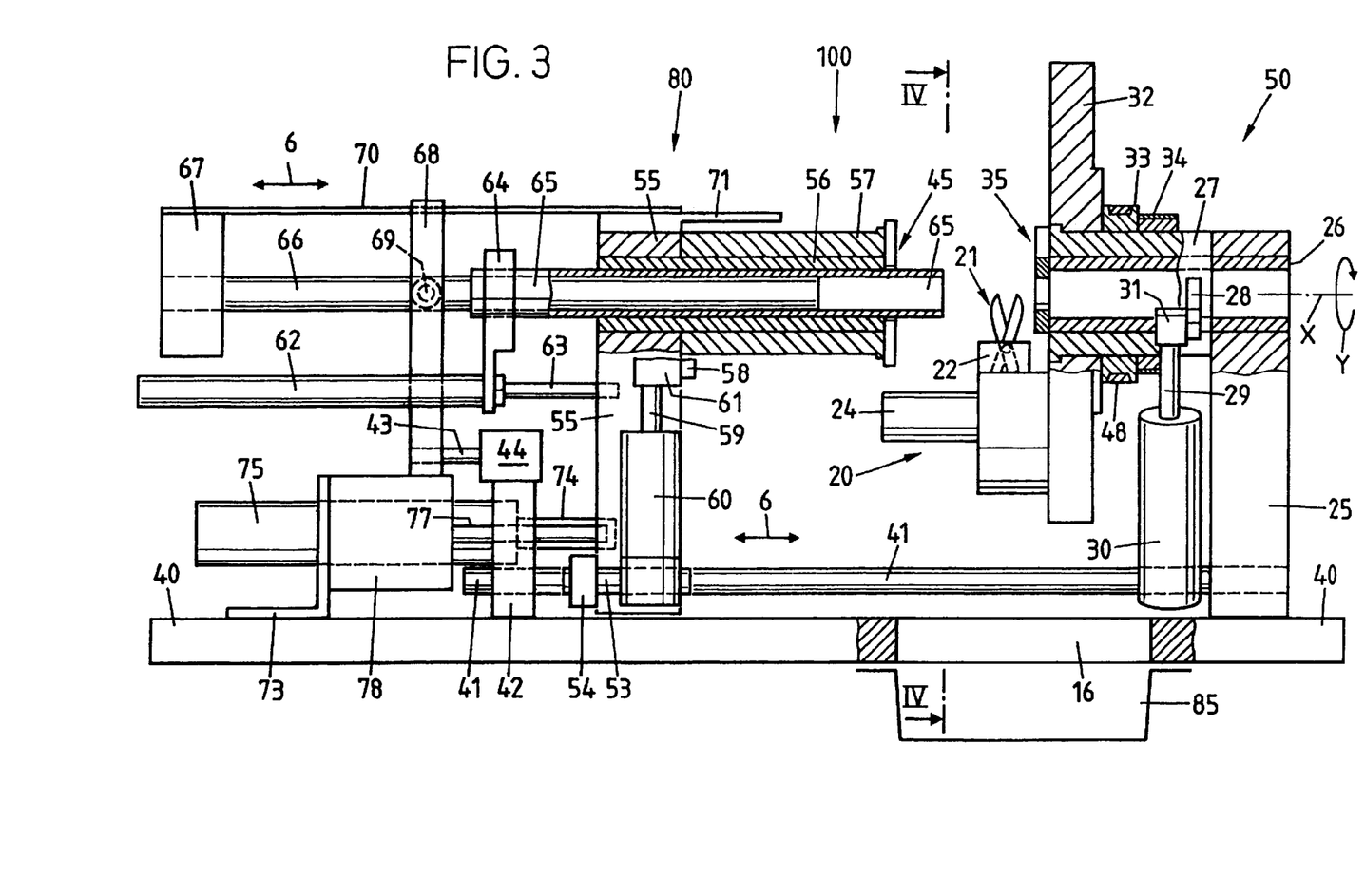
FIG. 3 is partial sectional view of an apparatus for stripping and removing an exposed shielding portion from a cable in accordance with the present invention.

In a first phase of the novel and inventive method according to the present invention, as shown in FIG. 1B, the cable 10 with the exposed shielding portion 12 is guided in a direction, indicated by arrow 1, through a throughboreof a first fixed clamping device 35 and pushed into a second clamping device 45, which is movable along the cable 10 relative to the clamping device 35, until impacting against a stop (not shown here, cf. adjustment member 66 in FIG. 3). For sake of simplicity, the clamping devices 35, 45 are each shown schematically in FIGS. 1B to 1I by way of example only in the form of two interacting clamping pieces that are movable relative to one another for opening and closing the clamping device, as indicated in FIG. 1B by the arrows so as to set forth the principle of the present invention. Structure and operation of the clamping devices 35, 45 will be described in more detail with reference to FIGS. 3 to 5.

After positioning the cable 10 with the exposed shielding portion 12 in a manner described above, the clamping devices 35, 45 are closed. The closing force applied by the clamping devices 35, 45 is such that the clamping device 35 holds the cable 10 in place via the insulating sheath 11, without damaging the insulating sheath 11, and the clamping device 45 engages the exposed shielding portion 12 at slight enough contact pressure that the shielding portion 12 can still be shifted relative to the conductors 15 in the direction of the clamping device 35.

Figure 1C:
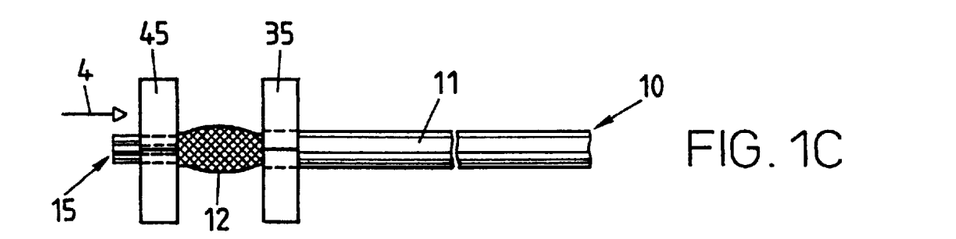

After clamping the cable 10 in the manner described, the clamping device 45 which is in engagement with the shielding portion 12 is moved in a direction of arrow 4 toward the stationary, closed clamping device 35, as shown in FIG. 1C, thereby compressing and bunching the shielding portion 12 between the two clamping devices 35, 45 in circumferential direction radially outwards. In this phase, the conductors 15, held together by the transparent envelope (not shown), remain in substantially stretched disposition and become exposed as well. The transparent envelope is later removed by suitable means, when the cable 10 is electrically connected.

Figure 1D:
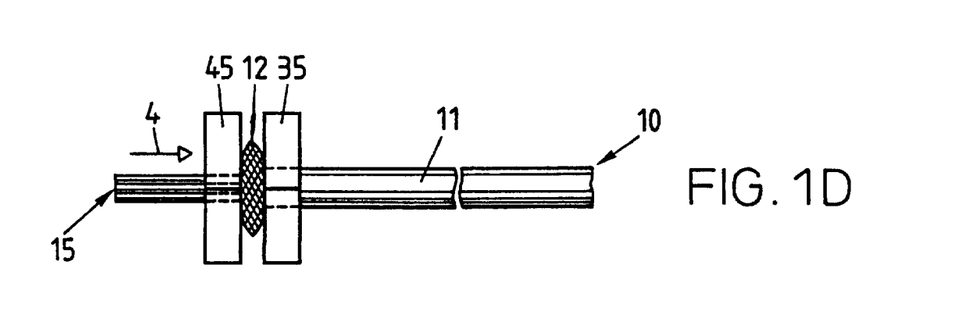

Subsequently, as shown in FIG. 1D, the clamping device 45 is further shifted in the direction of arrow 4 until the shielding portion 12 between the confronting clamping devices 35, 45 is so bunched up as to form a ring-shaped bead or assume a donut shape which is substantially wedge-shaped in the outer zone. In this phase, both radially outwardly oriented walls of the shielding portion 12 are pressed together, and the conductors 15 are exposed and jut out from the clamping device 45 in substantially stretched disposition.

Figure 1E:
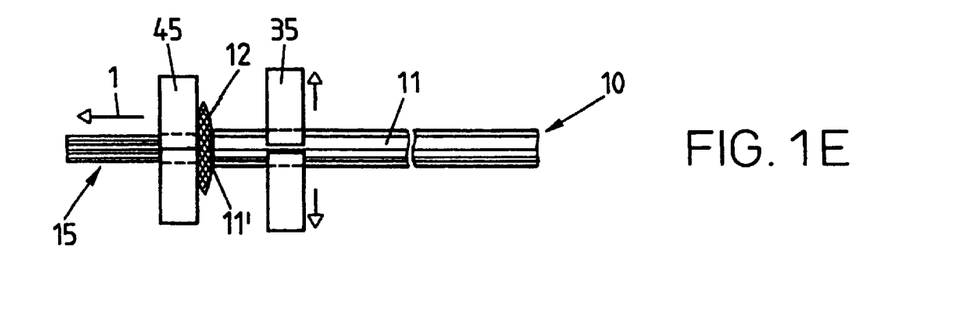

Next, as shown in FIG. 1E, the clamping device 35 is opened again whereas the clamping device 45 still clamps an end piece 12' (FIG. 1F, not visible in FIG. 1E) of the shielding portion 12 and thus the cable 10. The cable 10 is now pulled relative to the clamping device 35 in a direction of arrow 1, thereby conjointly moving the clamping device 45. The movement of the clamping device 45 in the direction of arrow 1 together with the cable 10 is restricted by an adjustable stop member (not shown here, cf. stop cylinder 78 in FIG. 3).

Figure 1F:
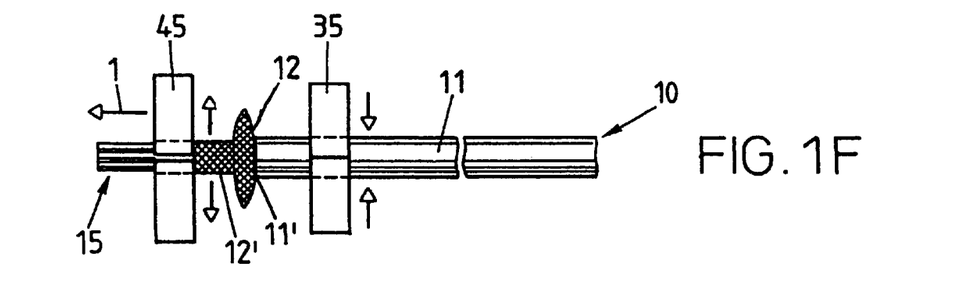

Next, as shown in FIG. 1F, the clamping device 35 is closed again for clamped engagement with the insulating sheath 11 of the cable 10. The clamping device 45 is then opened and pulled, together with the cable 10, in the direction of arrow 1 relative to the clamping device 35. In the end position, the circular bunched shielding portion 12 bears against a confronting circular ring shaped end face 11' of the insulating sheath 11 and is arranged between the two clamping devices 35, 45, normally in a midsection between the clamping devices 35, 45, and the conductors 15, enveloped by the end piece 12' of the shielding portion 12, partially jut out from the clamping device 45.

Figure 1G:
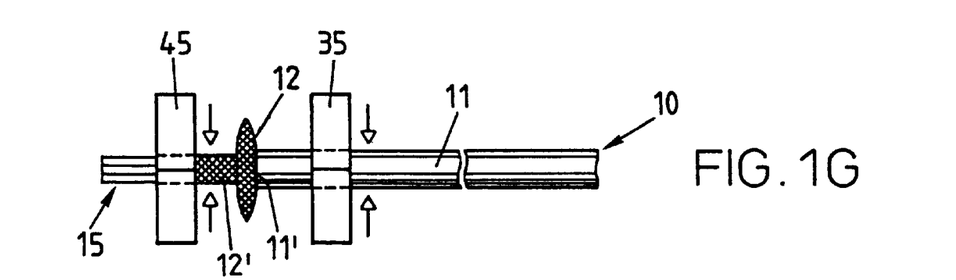

While the clamping device 35 is still closed and in clamped engagement with the insulating sheath 11, the clamping device 45 is now closed as well, as shown in FIG. 1G. In this position, the shielding portion 12 is held in the clamping device 45 via the end piece 12' at slight contact pressure, with the conductors 15 jutting out of the clamping device 45. The shielding portion 12 is securely held in place at this stage by the clamping devices 35, 45.

Figure 1H:
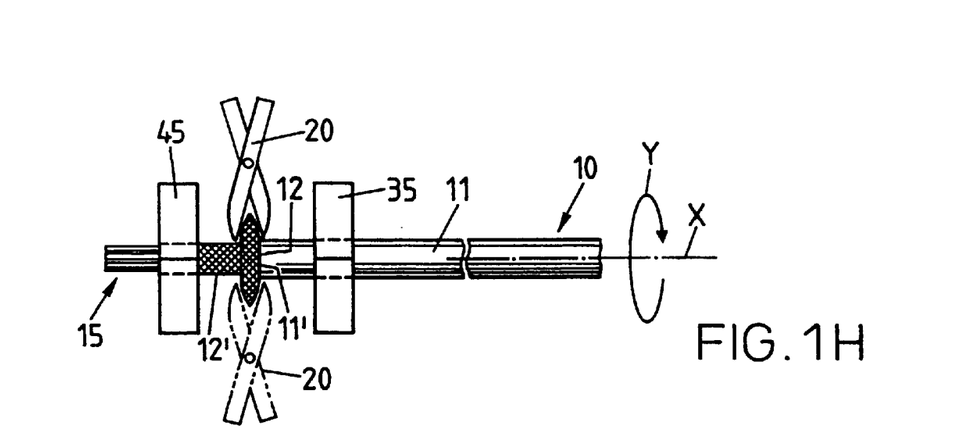

As the spaced-apart clamping devices 35, 45 are closed and engaged with the insulating sheath 11 and the end piece 12' of the shielding portion 12, respectively, at least one cutting unit 20 is activated to orbit, e.g. in clockwise direction, as indicated by arrow Y, in circumferential direction about the theoretical longitudinal axis X of the cable 10 to thereby sever a peripheral circular section 12" (cf. FIG. 2B) of the shielding portion 12 approximately flush with the outer diameter of the insulating sheath 11. As shown in FIG. 1H, the peripheral circular section 12" has a substantially triangular-shaped configuration. For sake of simplicity and ease of illustration, the cutting unit 20 is shown schematically in FIG. 1H merely by way of example in the form of two interacting blades that are movable relative to one another in order to set forth the principle of the present invention. Structure and operation of the cutting unit 20 will be described in more detail with reference to FIGS. 4 and 5.

Of course, it is certainly within the scope of the present invention to also move the cutting unit 20 from an idle position in a direction transversely to the elongation of the cable 10 toward the shielding portion 12, and then lock the cutting unit 20 in place whereupon the cable 10 is rotated about its longitudinal axis in the direction of arrow Y to orbit around the cutting unit 20, while the fixed cutting unit 20 is activated to sever the circular section 12" of the shielding portion 12.

Figure 1I:
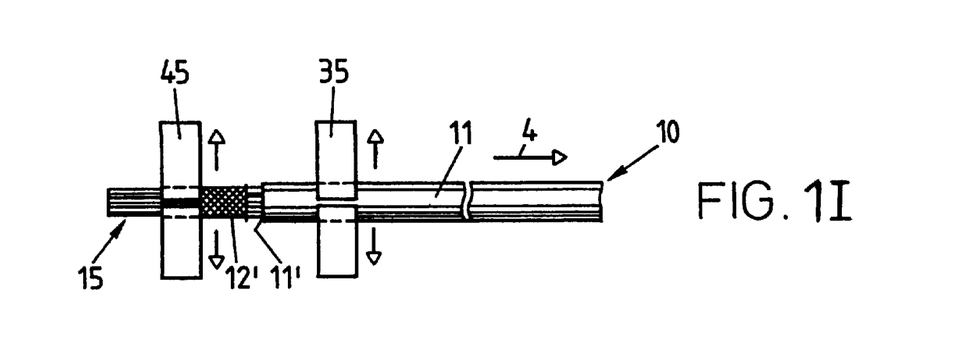

After severing the circular portion 12", both clamping devices 35, 45 are opened again, either simultaneously or sequentially, and the cable 10 is pulled out of the clamping devices 35, 45 in the direction of arrow 4, as shown in FIG. 1I. The end piece 12' of the shielding portion 12, which is left of the shielding portion 12 and still envelopes the conductors 15, may be removed either automatically as a result of a slight contact pressure applied by the clamping device 45 against the end piece 12' when withdrawing the cable 10 in the direction of arrow 4, or manually stripped from the conductors 15, after the cable 10 is pulled out.

Figure 2A:
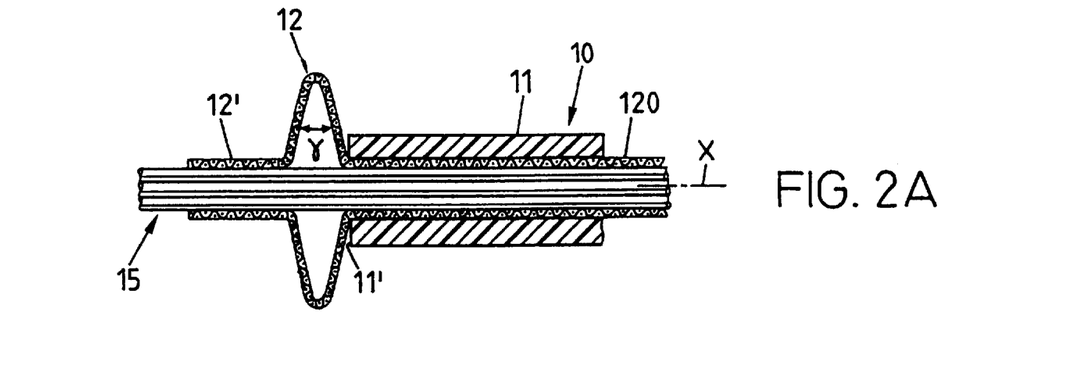
FIGS. 2A to 2D show partially sectional views, on an enlarged scale, of process steps for separating a circular section of the bunched shielding portion.
Figure 2B:
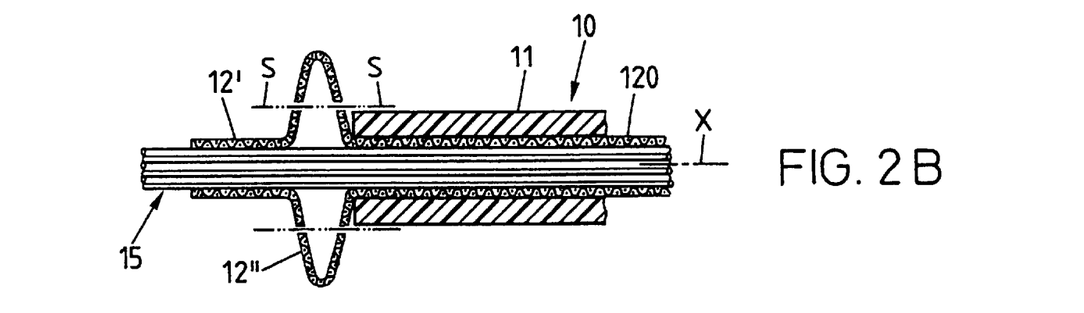
Figure 2C:
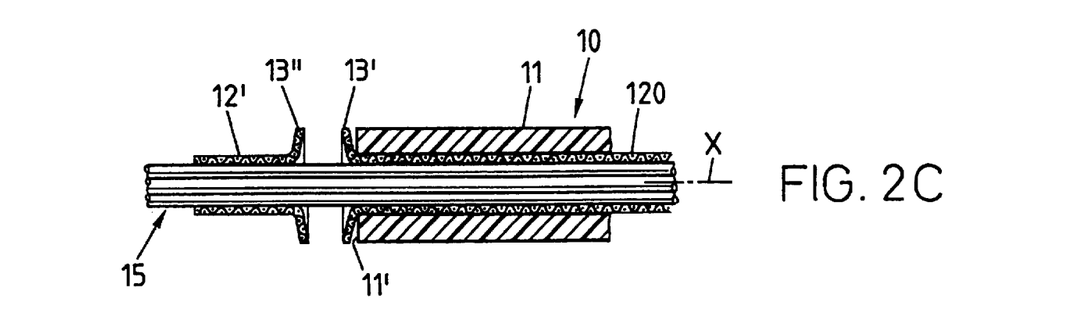
Figure 2D:
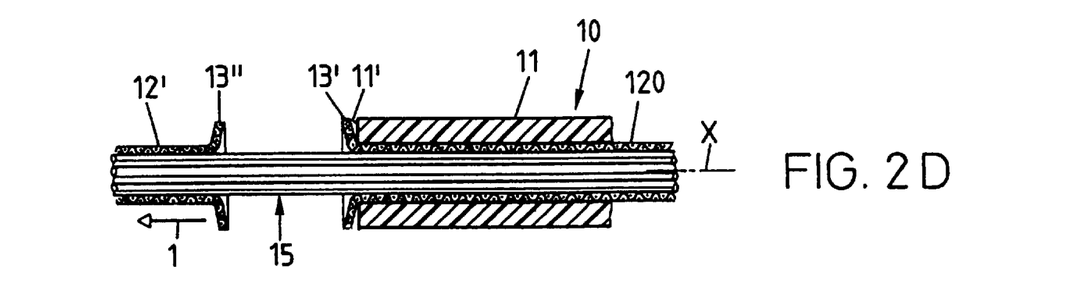

Turning now to FIGS. 2A to 2D, there are shown partially sectional views, on an enlarged scale, of the process steps for separating the peripheral circular section 12" of the bunched shielding portion 12. FIG. 2A shows the cable 10, the insulating sheath 11, the shielding 120, which envelopes the conductors 15, and the shielding portion 12, which is bunched up after compressing the shielding 120 and slightly spread as a consequence of the own elasticity (cf. FIGS. 1D and 1E), after removal of the clamping devices 35, 45. The shielding portion 12 of substantially triangular-shaped configuration bears with one sidewall against the circular end face 11' of the insulating sheath 11 and has an opposite sidewall whereby the sidewalls define an acute angle γ relative to one another so that the circular section 12" can be grasped by the cutting unit 20 in an optimum manner and severed at a cutting line S—S above the insulating sheath 11 or flush with the outer diameter of the insulating sheath 11, as illustrated in FIG. 2B. Suitably, the distance between the sidewalls should be as small as possible to attain an optimal cutting operation. Once the circular section 12" is separated and removed, only stubs 13', 13" of the sidewalls of the shielding portion 12 as well as the end piece 12' remain, whereby the sidewall stubs 13', 13" are separated from one another in spaced-apart disposition, with the sidewall stub 13" being attached to the end piece 12' and the sidewall stub 13' being attached to the shielding 120, as shown in FIG. 2C. The end piece 12' with attached sidewall stub 13" can now be stripped away from the conductors 15 by pulling it in the direction of arrow 1.

Turning now to FIG. 3, there is shown a partial sectional view of a shielding removal apparatus for carrying out the method as described above, generally designated by reference numeral 100. The apparatus 100 includes a first assembly 50, which combines the clamping device 35 with the cutting unit 20, and a second assembly 80, which combines the clamping device 45 with a drive mechanism for moving the clamping device 45 relative to the clamping device 35. The first assembly 50 includes a fixed bearing block 25 mounted on a base plate 40. Fitted in the bearing block 25 is a clamping sleeve 26 and, coaxial thereto, an outer bearing sleeve 27. Secured to the bearing sleeve 27 is a disk 32 which, in the non-limiting example illustrated here, is rotatable clockwise about pivot axis X and carries the cutting unit 20. Placed on the bearing sleeve 27 adjacent to and interacting with the disk 32 is a drive disk 33, which has external teeth, and a slip ring 34 formed with sliding contacts (not shown). The slip ring 34 forms part of a generally known electric motor (slip ring motor) and supplies electric current to the drive motor 24 (FIG. 4) of the cutting unit 20.

A pivot lever 28 has one end in cooperating relation with the bearing sleeve 27 and another end articulated to a head piece 31, which forms part of an actuating mechanism for opening and closing the clamping device 35. The actuating mechanism further includes a pneumatic or hydraulic cylinder 30 which accommodates a piston rod 29 whose free end is connected to the headpiece 31. Activation of the cylinder 30 results in a swinging motion of the pivot lever 28 via the piston rod 29, thereby pivoting the bearing sleeve 27 relative to the inner clamping sleeve 26 about the axis X to close and open the clamping device 35.

The cutting unit 20 has a mounting 22 for support of two blades 21, which are pivotally connected together by a pivot so as to be movable relative to one another, and a drive motor 24 which has an output journal 24' (FIG. 4) for connection to the disk 32 and is operatively connected to a gear mechanism 23. The gear mechanism 23 provides, on the one hand, a transmission of the speed of the drive motor 24 and, on the other hand an operation of the blades 21 in dependence on the speed. Thus, activation of the drive motor 24 results in a swinging of the cutting unit 20 from an idle position (FIG. 4) to an operative position about the journal 24' and movement in the direction of the theoretical axis X of the shielding removal apparatus 100 to sever the circular section 12" of the shielding portion 12. After separation, the circular section 12" drops in a container 85 through an opening 16 in the base plate 40.

The second assembly 80 includes a carrier 55, which is guided along two guide rods 41 for movement relative to the first assembly 50, and a fixed bearing block 42, which is mounted on the base plate 40 for support of the guide rods 41. A hydraulic or pneumatic cylinder 75 includes a piston rod 74 whose free end is received in the carrier 55 so that an activation of the cylinder 75 results in a displacement of the carrier 55 in a direction of double arrow 6 relative to the fixed bearing block 25. A bracket 73 secures to the base plate 40 a stop cylinder 78 whose piston rod 77 extends through the bearing block 42 for interaction with the carrier 55. Fitted in the carrier 55 are a clamping sleeve 56 and an outer bearing sleeve 57. Secured to the outer bearing sleeve 57 is one end of a pivot lever 58 whose other end is articulated to a headpiece 61, which forms part of an actuating mechanism for opening and closing the clamping device 45. The actuating mechanism further includes a pneumatic or hydraulic cylinder 60 which accommodates a piston rod 59 whose free end is connected to the headpiece 61. The cylinder 60 is connected at its lower end to a journal 53 which is received in a mounting 54 secured to the carrier 55. Activation of the cylinder 60 results in a swinging of the pivot lever 58, thereby pivoting the bearing sleeve 57 relative to the inner clamping sleeve 56 about the axis X to close and open the clamping device 45. For example, when the piston rod 59 occupies the retracted position in the cylinder 60, the clamping device 45 is opened.

Extending interiorly of the clamping sleeve 56 is a pickup pipe 65 for receipt of the cable 10. The pickup pipe 65 is secured at its end distal to the clamping device 45 in a mounting 64 which supports a pneumatic or hydraulic cylinder 62 which accommodates a piston rod 63 received in the carrier 55. Activation of the cylinder 62 conjointly shifts the mounting 64 and the pickup pipe 65 in axial direction relative to the clamping device 35 for capturing the inserted cable 10, when the clamping device 45 is open.

Accommodated in the pickup pipe 65 is an adjustment member 66 which forms a stop member for the cable 10 and is secured to a carrier frame 68. A drive 44 is connected to the carrier frame 68 via a piston rod 43 to thereby effect a displacement of the adjustment member 66. A set screw 69 is provided on the carrier frame 68 to secure the adjustment member 66 against axial displacement. Securely fixed to the rear free end of the adjustment member 66 is a retention member 67 which supports an elongate adjusting rail 70 extending through the carrier frame 68. The adjusting rail 70 is movable in the direction of arrow 6 relative to a graduation 71, e.g. a millimeter graduation, formed on the carrier 55. Through operation of the drive 44 via the piston rod 43 is it possible to adjust the position of the stop-forming adjustment member 66 in the pickup pipe 64 in dependence on the extent of the shielding portion 12 to be stripped away from the cable 10.

Figures 4, 5:
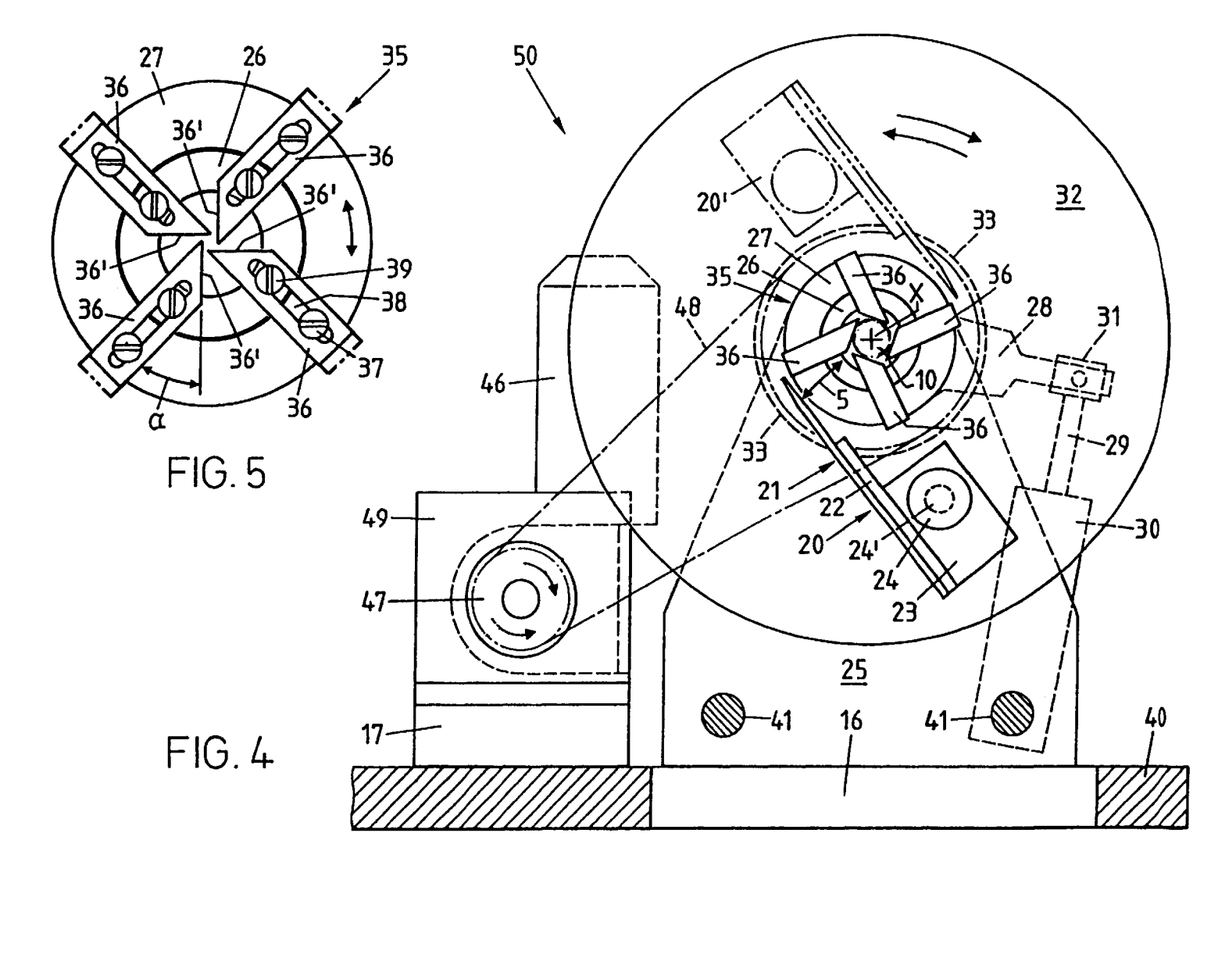
FIG. 4 is a sectional view of the apparatus of FIG. 3, taken along the line IV—IV in FIG. 3.
FIG. 5 is a schematic illustration of a clamping device for use in the apparatus of FIG. 3.

FIG. 4 shows an illustration of the first assembly 50, taken along the line IV—IV in FIG. 3. The clamping device 35 has a plurality of clamp pieces 36 which are movably secured about the circumference of the bearing sleeve 27. As illustrated in FIG. 4, a platform 17 is mounted onto the base plate 40 for support of a bearing member 49 for receiving a drive assembly 46 having an output gear 47 which is operatively connected via a toothed belt 48 with the toothed drive disk 33 upon the bearing sleeve 27. As shown in broken line, a second cutting unit 20 may be, optionally, secured to the disk 32. When providing only one cutting unit 20, the disk 32 with attached cutting unit 20 is rotated, e.g. clockwise as indicated, about an angle of 360° for separating the circular section 12" from the shielding portion 12. When mounting two cutting units 20 to the disk 32, each cutting unit 20 is rotated in increments about an angle of 180°. Of course, the cutting units 20 may also be so operated that each cutting unit 20 rotates about an angle of 180° in one direction of rotation and then is returned to its idle position by rotating in the opposite direction. Double arrow 5 indicates the direction of displacement of the cutting unit 20 with respect to the cable 10.

Figure 5A:
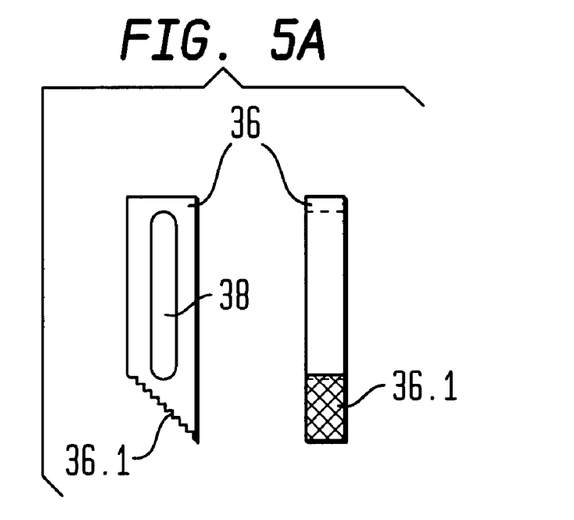
FIG. 5A is a schematic illustration of a variation of a clamp piece of a clamping device, having fluted clamping surface.
Figure 5B:
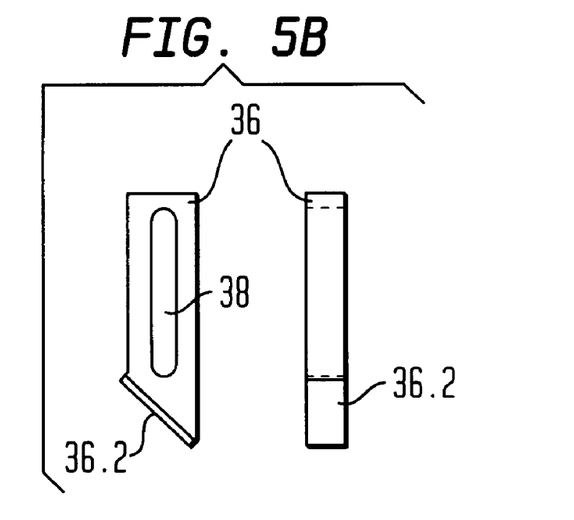
FIG. 5B is a schematic illustration of another variation of a clamp piece of a clamping device, having a clamping surface lined with a rubber coating.

FIG. 5 shows, on an enlarged scale, the structure of the clamping device 35. As the clamping devices 35, 45 are of an identical construction, it will be understood by persons skilled in the art that the following description of the clamping device 35 is equally applicable to the other clamping device 45. The clamp pieces 36 are each provided with an oblong hole 38 and secured by a screw 37 to the outer bearing sleeve 27 and a further screw 39 to the clamping sleeve 26. Each clamp piece 36 has a slanted end clamping surface 36' which defines an angle α, e.g. of about 45°, and is so configured that the insulating sheath 11 of the cable 10 will not be damaged during clamping action while still securely positioning the cable 10 in place during the cutting operation. FIG. 5 shows the clamp pieces 36 in substantially closed disposition. FIGS. 5A and 5B show variation of clamp pieces 36, with FIG. 5A showing the clamp piece 36 having a fluted clamping surface 36.1, and FIG. 5B showing the clamp piece 36 having a clamping surface 36.2 which is lined with a rubber coating.

While the invention has been illustrated and described as embodied in a method and apparatus for stripping and removing the shielding from a cable, it is not intended to be limited to the details shown since various modifications and structural changes may be made without departing in any way from the spirit of the present invention.

What is claimed as new and desired to be protected by Letters Patent is set forth in the appended claims:

1. A method of stripping and removing shielding from an end of a cable; comprising the steps of:

stripping away from an end of the cable an outer insulating sheath to expose a portion of shielding;

compressing the exposed shielding portion in an axial direction of the cable to so deform the shielding portion as to assume a donut shape which exceeds an outer dimension of the insulating sheath; and severing a circular section of the shielding portion by a movable cutting unit which servers said circular portion approximately transversely to a longitudinal orientation of the cable.

2. The method of claim 1 wherein said compressing step includes restraining the shielding portion between two clamping devices which are spaced-apart in the axial direction of the cable and movable relative to one another, and moving one of the clamping devices relative to the other one of the claming devices to thereby push together and bunch up the shielding portion with substantially adjoining sidewalls until the donut shape is realized.

3. The method of claim 2 wherein the bunched shielding portion is so positioned between the spaced-apart clamping devices as to permit engagement by the cutting unit.

4. The method of claim 1 wherein the compressing step includes bunching the shielding portion in such a manner that the circular section of the shielding portion has substantially adjoining circular ring shaped sidewalls and a substantially triangular configuration in an area above the insulating sheath.

5. The method of claim 4 wherein the bunching step is carried out such that the triangular-shaped circular section has walls extending at an acute angle.

6. The method of claim 1 wherein said severing step includes moving the cutting unit from an idle position, in which the cutting unit extends transversely to a longitudinal axis of the cable, to an operative position, in which the cutting unit orbits around the shielding portion for shearing off the circular section.

7. The method of claim 1 wherein said severing step includes moving the cutting unit from an idle position, in which the cutting unit extends transversely to a longitudinal axis of the cable, to an operative position, in which the cable and the compressed shielding portion are turned relative to the cutting unit for shearing off the circular section.

8. The method of claim 1 wherein the compressed shielding portion is sheared off directly at an outer periphery of the insulating sheath by the cutting unit orbiting around the shielding portion.

9. The method of claim 1 wherein the compressed shielding portion is sheared-off by opening and closing two blades of the cutting unit, with the blades being movable relative to one another and arranged directly at an outer circumference of the insulating sheath.

10. Apparatus for removing shielding from a cable; comprising:

a pair of clamping devices for insertion of a cable end which has been stripped of its insulating sheath to thereby expose a portion of a shielding, said clamping devices being so positioned at a distance to one another as to confine the exposed shielding portion therebetween, said clamping devices being movable relative to one another to compress and bunch up the shielding portion sufficient to assume a donut shape; and a cutting device movable in a direction transversely to a longitudinal direction of the cable for shearing off a circular section of the bunched shielding portion in said transverse direction.

11. The apparatus of claim 10, and further comprising a base plate, a stationary first assembly mounted on the base plate and supporting a first one of the clamping devices, a second assembly mounted on the base plate and including a carrier for supporting a second one of the clamping devices, and a drive mechanism acting on the carrier for moving the second assembly relative to the first assembly in an operating direction.

12. The apparatus of claim 11 wherein the second assembly includes two guide rods spaced from one another transversely to the operating direction for guiding the carrier during its movement relative to the first clamping device of the stationary first assembly.

13. The apparatus of claim 10 wherein each of the clamping devices has a clamping sleeve, a bearing sleeve received coaxially in the clamping sleeve, and at least two clamp pieces spaced circumferentially and so secured to the clamping sleeve and the bearing sleeve that a rotation of the clamping sleeve results in an opening or closing of the clamping device, said clamp pieces of one of the clamping devices and said clamp pieces of the other one of the clamping devices arranged in confronting disposition.

14. The apparatus of claim 13 wherein each of the clamp pieces has a slanted clamping surface, each of the clamping devices having four such clamp pieces spaced evenly circumferentially.

15. The apparatus of claim 14 wherein, for holding the cable, the clamping surface of each of the clamp pieces is one of fluted configuration and lined with a rubber coating which is gentle on the insulating sheath.

16. The apparatus of claim 12 wherein the second assembly further comprises a clamping sleeve and a pickup pipe arranged coaxial in the clamping sleeve and shiftable in an axial direction relative to the clamping device of the first assembly.

17. The apparatus of claim 16 wherein the second assembly includes an adjustment member arranged coaxially in the pickup pipe, and an adjusting rail interacting with the adjustment member, said adjustment member being shiftable in said axial direction with respect to the clamping device of the second assembly.

18. The apparatus of claim 17 wherein the adjustment member with the adjusting rail is adjustable with respect to a graduation, provided on the carrier, in dependence on the cable destined for insertion in the pickup pipe and on the bunched shielding portion being sheared off.

19. The apparatus of claim 11 wherein the first assembly has a disk rotating about a pivot axis, said cutting device being so mounted to the disk that a rotation of the disk positions the cutting device for shearing action of the bunched shielding portion.

20. The apparatus of claim 10 wherein the cutting device is a pair of scissors with two blades movable relative to one another by an electric motor.

21. Apparatus for removing shielding from a cable; comprising:

a pair of clamping devices for insertion of a cable end which has been stripped of its insulating sheath to thereby expose a portion of a shielding, said clamping devices being so positioned at a distance to one another as to confine the exposed shielding portion therebetween, said clamping devices being movable relative to one another to compress and bunch up the shielding portion sufficient to assume a donut shape; and a cutting device movable in a direction transversely to a longitudinal direction of the cable for shearing off a circular section of the bunched shielding portion in said transverse direction;

wherein the cutting device is a pair of scissors with two blades movable relative to one another by an electric motor.

* * * * *